United States Patent [19]

Scheffe

[11] Patent Number: 4,981,534

[45] Date of Patent: Jan. 1, 1991

[54] OCCUPANT RESTRAINT SYSTEM AND COMPOSITION USEFUL THEREIN

[75] Inventor: Robert S. Scheffe, Alexandria, Va.

[73] Assignee: Atlantic Research Corporation, Alexandria, Va.

[21] Appl. No.: 489,968

[22] Filed: Mar. 7, 1990

[51] Int. Cl.⁵ ............................................. C06B 45/10
[52] U.S. Cl. ................................... 149/19.91; 149/83; 149/85; 280/741
[58] Field of Search .................... 149/19.91, 83, 85; 280/741

[56] References Cited

U.S. PATENT DOCUMENTS

| | | | |
|---|---|---|---|
| 3,723,205 | 3/1973 | Scheffee | 149/19 |
| 3,897,285 | 7/1975 | Hamilton | 149/41 |
| 3,901,747 | 8/1975 | Garner | 149/42 |
| 4,214,438 | 7/1980 | Hamilton et al. | 149/83 |
| 4,238,253 | 12/1980 | Garner | 149/83 |

Primary Examiner—Stephen J. Lechert, Jr.
Attorney, Agent, or Firm—Laubscher, Presta and Laubscher

[57] ABSTRACT

A gas-generating composition of matter which burns to produce a non-toxic, non-corrosive, non-flammable combustion product. The composition comprises:

A. plasticized polyvinyl chloride fuel binder; and
B. certain inorganic oxidizer salts; and
C. lithium carbonate;

The oxidizer is present in an amount at least sufficient to convert all available carbon to carbon dioxide and to convert all available hydrogen to water and to fully oxidize all available alkaline earth metals.

The lithium carbonate is present in an amount at least sufficient to convert all available halogen to lithium halide.

The composition is useful to generate gas in a vehicle occupant restraint system.

9 Claims, 1 Drawing Sheet

U.S. Patent  Jan. 1, 1991  4,981,534
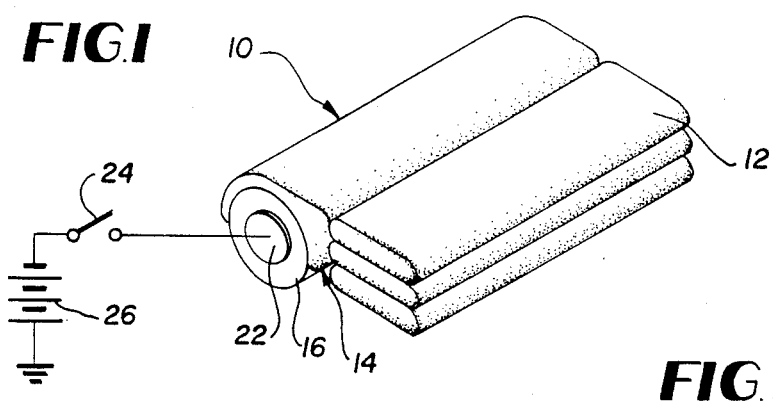
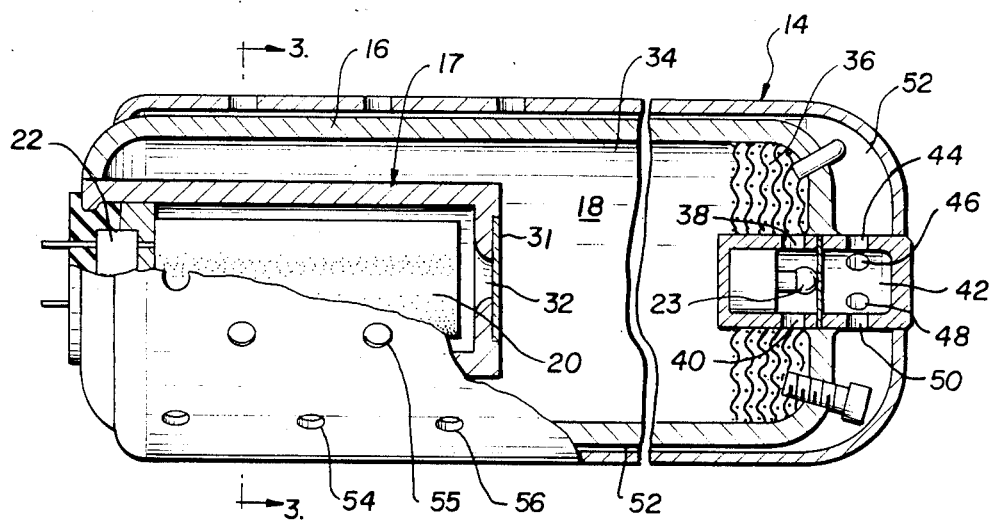
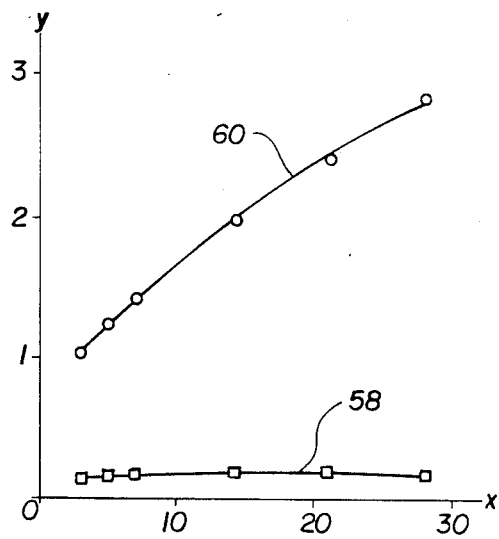

OCCUPANT RESTRAINT SYSTEM AND COMPOSITION USEFUL THEREIN

This invention relates to an occupant restraint system for vehicles sometimes called an "air bag" and a composition of matter useful to generate the gas necessary to inflate the bag.

Occupant restraint systems are well known in the art as described for example in U.S. Pat. No. 3,723,205.

Unfortunately prior systems and compositions suffer from a number of disadvantages. Many prior compositions are unstable during storage. They pick up moisture from the air and become nonignitable. Many prior compositions become unstable in the presence of moisture.

Many prior compositions produce an unacceptably high level of carbon monoxide. This carbon monoxide can cause serious injury or even death to vehicle occupants who escape physical injury due to the very restraint system designed to keep them safe. As is well known the carbon monoxide combines with the hemoglobin of the blood preventing the tissues from receiving oxygen.

Still other prior compositions burn at too high a temperature. This high temperature can melt the bag or can directly injure the passengers.

Accordingly it is an object of the present invention to provide an improved occupant restraint system substantially free of one or more of the disadvantages of prior systems.

Another object of the present invention is to provide an improved composition of matter useful to generate the gas to inflate an air bag wherein the composition does not have the disadvantages of prior compositions.

An additional object is to provide a composition which is stable during storage for long periods of time, which does not pick up water, which does not burn more slowly after storage and which does not exhibit other undesirable changes during storage.

Another object is to provide an improved gas-generating composition of matter which upon burning, produces less carbon monoxide than prior compositions.

Still another object is to provide an improved composition that burns at a lower temperature than prior compositions.

The invention may be better understood by reference to the drawings wherein:

FIG. 1 is a schematic representation of an occupant restraint system of the present invention; and FIG. 2 is a gas generator used to hold the gas generating composition of matter of the present invention and use it in the system of FIG. 1; and FIG. 3 is a sectional view taken along line 3—3 of FIG. 2, but showing only the gas generating composition; and FIG. 4 is a graph showing the unexpectedly lower rate of water sorption of compositions of the present invention compared to another composition.

According to the present invention there is provided an apparatus for minimizing injury to vehicle occupants in the event of sudden deceleration of the vehicle. The apparatus comprises:

I. an uninflated, inflatable bag; and
II. a replaceable cartridge comprising:
 (a) a container; and
 (b) a high-pressure inert gas within the container; and
 (c) a gas-generating composition within the container; and
III. means responsive to sudden deceleration of the vehicle for igniting the gas-generating composition of matter, for burning the gas-generating composition thereby producing combustion products, for mixing these combustion products with the high pressure inert gas to form a warm gas mixture within the container and for utilizing this warm gas mixture to inflate the inflatable bag;

wherein the gas-generating composition comprises: a nontoxic, noncorrosive, and nonflammable combustible, gas-generating composition of matter comprising:

A. plasticized polyvinyl chloride fuel binder; and
B. an inorganic oxidizer salt selected from the group consisting of: alkali metal chlorates, alkali metal perchlorates, alkaline earth metal chlorates, alkaline earth metal perchlorates and mixtures thereof; and
C. lithium carbonate; and
wherein the oxidizer is present in an amount at least sufficient to convert all available carbon to carbon dioxide and to convert all available hydrogen to water and to fully oxidize all available alkaline earth metal; and
wherein the lithium carbonate is present in an amount at least sufficient to convert all available halogen to lithium halide.

Referring now to the drawings in general and in particular to FIGS. 1 and 2 there is shown an apparatus 10 of the present invention. The apparatus 10 is useful for minimizing injury to the occupants of a vehicle if the vehicle suddenly decelerates. The apparatus 10 comprises an uninflated, inflatable bag 12 and a replaceable cartridge 14. The cartridge 14 comprises a container 16. Within the container 16 is a high pressure, inert gas 18 and a gas-generating composition 20 housed in the propellant case 17. The apparatus 10 also has an igniter 22 and squib 23 in series with a deceleration-responsive switch 24 and a power source 26.

Referring now to FIG. 2, it can be seen that the igniter 22 is adjacent to the composition 20. When the igniter 22 is energized it forces hot gases through the holes 28, 29, 30 (see FIG. 3) in the composition 20. The squib 23 is energized simultaneously with the igniter 22, and ruptures the burst disc 37 venting the cylinder. The composition 20 then burns creating combustion products which rupture the disc 31 and pass through the orifice 32 into the mixing zone 34. In the zone 34 these combustion products mix with the inert gas 18. The resultant hot mixture passes through the filter 36, through the orifices 38, 40 and into an intermediate chamber 42. The gasses pass from the intermediate chamber 42 through the diverter orifices 44, 46, 48, 50 and into the gas distribution chamber 52. The hot gases then leave the chamber 52 through a large number of orifices such as orifices 54, 55, 56. These orifices 54, 55, 56 are aligned in the apparatus 10 with a passage (not shown) which directs the gasses to the bag 12 causing it to inflate.

The inert gas useful in the present invention can be nitrogen, helium or argon or mixtures thereof. Argon is preferred because of cost, availability and nonreactivity. The pressure of the inert gas in the zone 34 can vary widely but is generally between about 140 and 710 $kg/m^2$ (1000 to 5000 psi), but is preferably 355 to 500 $kg/m^2$ (2500 to 3500 psi).

The composition of matter of the present invention includes an inorganic oxidizer salt selected from the group consisting of: alkali metal chlorates, alkali metal perchlorates, alkaline earth metal chlorates, alkaline earth metal perchlorates and mixtures thereof.

The oxidizer is present in an amount at least sufficient to convert all available carbon to carbon dioxide and to convert all available hydrogen to water and to fully oxidize all available metal to its primary oxide. As used herein the term, available metal means that amount of the metal which does not react with chlorine to form its chloride. The primary oxide of a metal is that oxide containing the greatest amount of oxygen. For example $ZrO_2$ is the primary oxide of zirconium since it contains more oxygen than does $ZrO$ or for that matter any other oxide of zirconium.

As used herein the term, available halogen, means the halogen such as the chlorine released by the polyvinyl chloride but not the halogen in any alkali metal oxidizer salt present. Examples of oxidizer salts which produce available halogen are the alkaline earth metal chlorates and alkaline earth metal perchlorates and strontium perchlorate in particular.

The lithium carbonate is present in the composition in an amount at least sufficient to convert all available halogen to lithium halide. An excess of lithium carbonate is not harmful. In one preferred embodiment of the present invention the molar ratio of lithium carbonate to available halogen is 1:1 to 1.3:1.

The term polyvinyl chloride as used herein includes both the homopolymer and an interpolymer containing up to about ten percent (10%) by weight of a copolymerizable component such as vinyl acetate or vinylidene chloride. Preferably the polyvinyl chloride is essentially fully polymerized and is employed in the form of plastisol-grade spheroidal particles.

Any organic liquid plasticizer compatible with polyvinyl chloride can be employed. Such plasticizers are well known in the art. Preferably the plasticizer is of the type suitable for fluid plastisol formation, as for example, alkyl and alkoxyalkyl adipates, sebacates, and phthalates. Specific examples include dibutyl sebacate, dioctyl sebacate, dibutyl phthalate, dioctyl phthalate, dimethoxyethyl phthalate, dibutyl adipate, dioctyl adipate, di(3,5,5-trimethylhexyld adipate. Other plasticizers include glycol esters of higher fatty acids. The plastisol-forming plasticizers are high boiling solvents for the polyvinyl chloride which form fluid suspensions with the particles of polyvinyl chloride at ordinary temperatures because of the low solubility at such temperatures and dissolve the polyvinyl chloride at elevated temperatures to form a solid gel.

The preferred weight ratio of polyvinyl chloride to plasticizer is generally from about 1:5 to 5:1 and preferably from 2:3 to 3:2.

The compositions of the present invention can accomodate up to as much as ninety percent (90°) by weight of added solids if the particle sizes of the added solids are properly selected and distributed, without loss of adequate fluidity to permit casting and curing without the application of high pressures.

The invention is further illustrated by the following examples in which all parts and percentages are by weight unless otherwise indicated. These non-limiting examples are illustrative of certain embodiments designed to teach those skilled in the art how to practice the invention and to represent the best mode presently known for carrying out the invention.

EXAMPLE 1

This example is illustrative of the present invention.

The following quantities of the following ingriedients are combined as indicated.

| Item | Ingredient | Parts by weight |
|------|------------|-----------------|
| A | polyvinyl chloride | 5733 |
| B | dioctyl adipate | 8600 |
| C | Ferro 1203 | 229 |
| D | carbon black | 50 |
| E | lithium carbonate | 3388 |
| F | potassium perchlorate | 82000 |

Items A through F inclusive were placed in a mixing bowl and throughly mixed and then formed into test samples approximately the size of a cigarette at a temperature of about 335° F. and allowed to cool to room temperature (20° C.). The resultant product is termed "Arcite 497L".

The burning rate measured by the Crawford Bomb Test just after manufacture was found to be 38.4 mm (1.51 inches) per second at a pressure of 284 kg/m$^2$ (2000 psi). Some years later after ambient storage in non-hermetic containers the burning rate was surprisingly found to be undiminished and was 38.9 mm (1.53 inches) per second under the same conditions. There were no observed visual changes and no mechanical changes during storage.

EXAMPLE 2

This example is not illustrative of the present invention. This example shows the undesirable water absorption when the lithium carbonate employed in inventive compositions is replaced by sodium carbonate.

The following quantities of the following ingriedients are combined as indicated.

| Item | Ingredient | Parts by weight |
|------|------------|-----------------|
| A | polyvinyl chloride | 5594 |
| B | dioctyl adipate | 8390 |
| C | Ferro 1203 | 224 |
| D | carbon black | 50 |
| E | sodium carbonate | 4742 |
| F | potassium perchlorate | 81000 |

Items A through F inclusive were placed in a mixing bowl and throughly mixed and then formed into test samples approximately the size of a cigarette at a temperature of about 168° C. (335° F.) and allowed to cool room temperature (20° C.). The resultant product is termed "Arcite 497C".

The rate of water absorption of the non-inventive Arcite 497C of this example is compared to that of inventive Arcite 497L produced as described in Example 1. The results are shown on the graph reproduced as FIG. 4 wherein the percent of water absorbed is plotted on the y-axis and the length of time in days is plotted on the x-axis. The curve 58 is that of the inventive Arcite 497L of Example 1, whereas the curve 60 is that of the comparative composition, Arcite 497C containing sodium carbonate in place of lithium carbonate. As can be seen by reference to FIG. 4 the non-inventive, sodium carbonate containing composition picks up as much as almost three percent water over about thirty days whereas the inventive composition picks up almost no water as shown by the flat curve 58.

Although the invention has been described in considerable detail with reference to certain preferred embodiments thereof, it will be understood that variations and modifications can be made without departing from the spirit and scope of the invention as described above and as defined in the appended claims.

What is claimed is:

1. A gas-generating composition of matter which burns to produce a non-toxic, non-corrosive, non-flammable combustion product, said composition of matter comprising:
A. plasticized polyvinyl chloride fuel binder; and
B. an inorganic oxidizer salt selected from the group consisting of: alkali metal chlorates, alkali metal perchlorates, alkaline earth metal chlorates, alkaline earth metal perchlorates and mixtures thereof; and
C. lithium carbonate; and
   wherein the oxidizer is present in an amount at least sufficient to convert all available carbon to carbon dioxide and to convert all available hydrogen to water and to fully oxidize all available alkaline earth metal; and
   wherein the lithium carbonate is present in an amount at least sufficient to convert all available halogen to lithium halide.

2. The composition of claim 1 wherein the weight ratio of polyvinyl chloride to plasticizer is from about 1:5 to 5:1.

3. The composition of claim 1 wherein the weight ratio of polyvinyl chloride to plasticizer is from about 2:3 to 3:2.

4. The composition of claim 1 wherein the molar ratio of lithium carbonate to available halogen is from about 1:1 to about 1.3:1.

5. The composition of claim 1 wherein the oxidizer is potassium perchlorate.

6. An apparatus for minimizing injury to vehicle occupants in the event of sudden deceleration of the vehicle; said apparatus comprising:
I. an uninflated, inflatable bag; and
II. a replaceable cartridge comprising:
   (a) a container; and
   (b) a high-pressure inert gas within the container; and
   (c) a gas-generating composition within the container; and
III. means responsive to sudden deceleration of the vehicle for igniting the gas-generating composition of matter, for burning the gas generating composition thereby producing combustion products, for mixing these combustion products with the high pressure inert gas to form a warm gas mixture within the container and for utilizing this warm gas mixture to inflate the inflatable bag;
   wherein the gas-generating composition comprises:
A. plasticized polyvinyl chloride fuel binder; and
B. an inorganic oxidizer salt selected from the group consisting of: alkali metal chlorates, alkali metal perchlorates, alkaline earth metal chlorates, alkaline earth metal perchlorates and mixtures thereof; and
C. lithium carbonate; and
   wherein the oxidizer is present in an amount at least sufficient to convert all available carbon to carbon dioxide and to convert all available hydrogen to water and to fully oxidize all available alkaline earth metal; and
   wherein the lithium carbonate is present in an amount at least sufficient to convert all available halogen to lithium halide.

7. The apparatus of claim 6 wherein the inert gas is argon.

8. The apparatus of claim 6 wherein the inert gas is present at a pressure of from about 1000 to 5000 psi.

9. The apparatus of claim 6 wherein the inert gas is present at a pressure of from about 2500 to 3500 psi.

* * * * *

UNITED STATES PATENT AND TRADEMARK OFFICE
CERTIFICATE OF CORRECTION

| | | |
|---|---|---|
| PATENT NO. | : | 4,981,534 |
| DATED | : | Jan. 1, 1991 |
| INVENTOR(S) | : | Scheffee, Robert S. |

It is certified that error appears in the above-identified patent and that said Letters Patent is hereby corrected as shown below:

Title page, in the heading, second line, delete "Scheffe" and insert --Scheffee--;

Title page, line (75), delete "Scheffe" and insert --Scheffee--.

Signed and Sealed this

Twenty-third Day of June, 1992

Attest:

DOUGLAS B. COMER

*Attesting Officer*     *Acting Commissioner of Patents and Trademarks*

REEXAMINATION CERTIFICATE (3118th)

United States Patent [19]
Scheffee

[11] B1 4,981,534
[45] Certificate Issued Feb. 4, 1997

[54] OCCUPANT RESTRAINT SYSTEM AND COMPOSITION USEFUL THEREIN

[75] Inventor: Robert S. Scheffee, Alexandria, Va.

[73] Assignee: Atlantic Research Corporation, Alexandria, Va.

Reexamination Requests:
No. 90/003,008, Mar. 29, 1993
No. 90/003,518, Aug. 3, 1994

Reexamination Certificate for:
Patent No.: 4,981,534
Issued: Jan. 1, 1991
Appl. No.: 489,968
Filed: Mar. 7, 1990

Certificate of Correction issued Jun. 23, 1992.

[51] Int. Cl.[6] ............... B60R 21/28; C06B 45/10
[52] U.S. Cl. ............. 280/741; 149/19.91; 149/83; 149/85
[58] Field of Search ............... 149/19.91, 83, 149/85; 28/741

[56] References Cited

U.S. PATENT DOCUMENTS 3,723,205  3/1973  Scheffee ................... 149/19.91
3,756,621  9/1973  Lewis et al. ................ 280/741

*Primary Examiner*—Edward A. Miller

[57] ABSTRACT

A gas-generating composition of matter which burns to produce a non-toxic, non-corrosive, non-flammable combustion product. The composition comprises:
A. plasticized polyvinyl chloride fuel binder; and
B. certain inorganic oxidizer salts; and
C. lithium carbonate;

The oxidizer is present in an amount at least sufficient to convert all available carbon to carbon dioxide and to convert all available hydrogen to water and to fully oxidize all available alkaline earth metals.

The lithium carbonate is present in an amount at least sufficient to convert all available halogen to lithium halide.

The composition is useful to generate gas in a vehicle occupant restraint system.

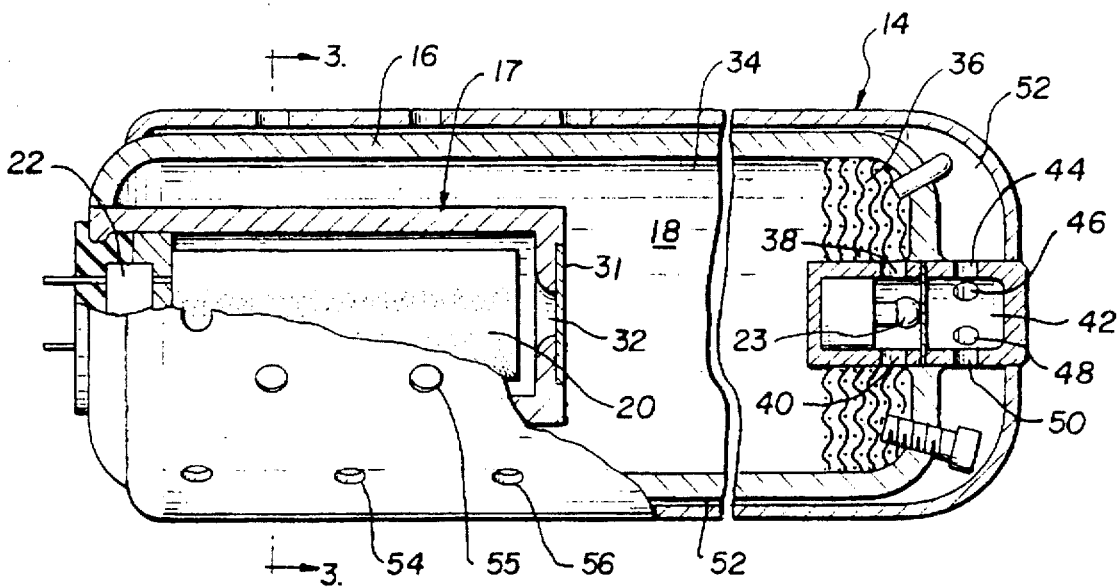

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–9 is confirmed.

* * * * *